(12) United States Patent
Vinson et al.

(10) Patent No.: US 11,597,042 B2
(45) Date of Patent: Mar. 7, 2023

(54) PRINTABLE SURFACE TREATMENT FOR ALUMINUM BONDING

(71) Applicant: AVERATEK CORPORATION, Santa Clara, CA (US)

(72) Inventors: Michael Riley Vinson, Sunnyvale, CA (US); Calvin Chen, Daly City, CA (US); Divyakant P Kadiwala, Fremont, CA (US); Sunity K Sharma, Fremont, CA (US)

(73) Assignee: Averatek Corporation, Santa Clara, CA (US)

( * ) Notice: Subject to any disclaimer, the term of this patent is extended or adjusted under 35 U.S.C. 154(b) by 224 days.

(21) Appl. No.: 16/196,754

(22) Filed: Nov. 20, 2018

(65) Prior Publication Data

US 2019/0152002 A1 May 23, 2019

Related U.S. Application Data

(63) Continuation-in-part of application No. PCT/US2018/026300, filed on Apr. 5, 2018.

(Continued)

(51) Int. Cl.
*B23K 35/36* (2006.01)
*C09D 11/06* (2006.01)
(Continued)

(52) U.S. Cl.
CPC ............ *B23K 35/362* (2013.01); *C09D 11/03* (2013.01); *C09D 11/033* (2013.01); *C09D 11/06* (2013.01);

(Continued)

(58) Field of Classification Search
None
See application file for complete search history.

(56) References Cited

U.S. PATENT DOCUMENTS 2,238,068 A * 4/1941 Miller ................ B23K 35/3612
148/23
2,788,303 A * 4/1957 Ballard .............. B23K 35/3615
148/23

(Continued)

FOREIGN PATENT DOCUMENTS

CN 101480764 7/2009
CN 103317259 9/2013
(Continued)

OTHER PUBLICATIONS

PCT Search Report & Written Opinion for PCT/US2018/026300 filed on Apr. 5, 2018 in the name of Averatek Corporation entitled Printable Surface Treatment for Aluminum Bonding (dated Aug. 14, 2018); 14 pages.

(Continued)

*Primary Examiner* — Devang R Patel
(74) *Attorney, Agent, or Firm* — Fish IP Law, LLP

(57) ABSTRACT

Compositions and methods for coupling metals to aluminum surfaces are provided. The compositions are prepared as aqueous solutions or suspensions, and can be applied to the aluminum surface using conventional printing techniques. Rheology of the printable composition can be adjusted to provide a gel or a cream. Curing steps, if necessary, are performed at low temperatures that are compatible with plastic/polymer components of mass produced devices, such as aluminum RFID antennae.

15 Claims, 6 Drawing Sheets

Screen Printed DDAHF On the Bond Pad

Related U.S. Application Data

(60) Provisional application No. 62/482,092, filed on Apr. 5, 2017.

(51) Int. Cl.

| | | |
|---|---|---|
| *B23K 35/362* | (2006.01) | |
| *C09D 11/03* | (2014.01) | |
| *C09D 11/033* | (2014.01) | |
| *C09D 11/38* | (2014.01) | |
| *B05D 7/14* | (2006.01) | |
| *B23K 103/10* | (2006.01) | |

(52) U.S. Cl.
CPC ............... *C09D 11/38* (2013.01); *B05D 7/14* (2013.01); *B05D 2202/25* (2013.01); *B05D 2401/20* (2013.01); *B23K 2103/10* (2018.08)

(56) References Cited

U.S. PATENT DOCUMENTS

| | | | | |
|---|---|---|---|---|
| 2,840,499 | A * | 6/1958 | Aronberg | B23K 35/3603 |
| | | | | 148/23 |
| 2,845,700 | A | 8/1958 | Bagno | |
| 2,981,648 | A * | 4/1961 | Peterson | B23K 35/3603 |
| | | | | 148/23 |
| 3,008,230 | A | 11/1961 | Babcock | |
| 3,066,405 | A * | 12/1962 | Eichhorn | B23K 35/3603 |
| | | | | 228/207 |
| 3,119,179 | A * | 1/1964 | Gale | B23K 35/3612 |
| | | | | 228/223 |
| 3,330,028 | A * | 7/1967 | Elbreder | B23K 35/3603 |
| | | | | 228/223 |
| 3,350,772 | A * | 11/1967 | Ulam | B23K 20/2275 |
| | | | | 428/653 |
| 3,960,613 | A | 6/1976 | Stayner | |
| 4,017,968 | A | 4/1977 | Weglin | |
| 4,041,273 | A * | 8/1977 | Francisco | B23K 20/04 |
| | | | | 219/121.14 |
| 4,113,525 | A | 9/1978 | Stayner | |
| 4,842,699 | A | 6/1989 | Hua | |
| 4,891,069 | A | 1/1990 | Holtzman | |
| 4,895,606 | A * | 1/1990 | Jafri | B23K 35/3603 |
| | | | | 148/24 |
| 6,059,174 | A * | 5/2000 | Kojima | B23K 1/203 |
| | | | | 228/183 |
| 6,475,610 | B1 * | 11/2002 | Keener | C22F 1/053 |
| | | | | 428/689 |
| 6,656,290 | B1 * | 12/2003 | Koch | B23K 35/025 |
| | | | | 148/24 |
| 6,667,194 | B1 * | 12/2003 | Crane | C07D 303/44 |
| | | | | 525/488 |
| 8,070,045 | B1 * | 12/2011 | Fleming | B23K 1/0016 |
| | | | | 228/180.21 |
| 9,113,547 | B2 | 8/2015 | Guzek | |
| 2005/0217757 | A1 * | 10/2005 | Miyano | B23K 35/34 |
| | | | | 148/24 |
| 2015/0053770 | A1 | 2/2015 | Preikszat | |
| 2015/0158128 | A1 * | 6/2015 | Hagiwara | B23K 35/362 |
| | | | | 148/24 |
| 2016/0175994 | A1 * | 6/2016 | Pandher | B23K 35/3612 |
| | | | | 228/223 |

FOREIGN PATENT DOCUMENTS

| | | | | |
|---|---|---|---|---|
| CN | 105102182 | | 11/2015 | |
| GB | 684082 A | * | 12/1952 | ......... B23K 35/3615 |
| GB | 1478644 A | * | 7/1977 | ......... B23K 35/0222 |
| JP | 4989652 | | 8/1974 | |
| JP | 55151249 | | 11/1980 | |
| JP | S55151249 | | 11/1980 | |
| JP | 6064793 | | 4/1985 | |
| JP | 644956 | | 6/1994 | |
| JP | 2002224884 | | 8/2002 | |
| JP | 200470983 | | 3/2004 | |
| JP | 2005169495 | | 6/2005 | |
| KR | 10-2016-0092284 | | 8/2016 | |
| KR | 20160092284 | | 8/2016 | |
| PL | 146096 | | 12/1988 | |
| SU | 1364425 | | 1/1988 | |
| TW | 533116 | | 5/2003 | |
| TW | 201036509 | | 10/2010 | |
| WO | 2015028813 | | 3/2015 | |

OTHER PUBLICATIONS

Durairaj, et al. "Rheological characterisation and printing performance of Sn/Ag/Cu solder pastes," Materials and Design 30 (2009) 3812-3818. 8 pages.

Hsu, et al. "Effect of polymer binders in screen printing technique of silver pastes," J Polym Res (2013) 20:277. 9 pages.

* cited by examiner

PRINTABLE SURFACE TREATMENT FOR ALUMINUM BONDING

This application is a continuation-in-part to copending International Application No. PCT/US2018/026300 filed on Apr. 5, 2018, which claims priority to U.S. Provisional Application No. 62/482,092 filed on Apr. 5, 2017. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is metal bonding, more specifically aluminum bonding.

BACKGROUND

The following description includes information that may be useful in understanding the present invention. It is not an admission that any of the information provided herein is prior art or relevant to the presently claimed invention, or that any publication specifically or implicitly referenced is prior art.

Aluminum has the advantage of being lightweight, readily available, recyclable, and reasonably conductive. Aluminum is also remarkably corrosion resistant due to the rapid formation of a durable oxide layer on exposed aluminum surfaces. Unfortunately this oxide layer interferes with joining to other metals as described by Babcock et. al. (see Ref 1). While bonding of other metals to aluminum can be problematic it is important to have the ability to bind metals to aluminum in order to fabricate electronic devices (particularly RFID tags). Low cost RFID tags typically have aluminum antennas. The antenna is typically bonded to another electronic device for signal communication, which in turn requires bonding of metals to aluminum metal. Aluminum surface has an oxide coating on top. An appropriate surface treatment of aluminum is required, therefore, to enable aluminum to bind to other metals.

Several surface treatments for application to aluminum in order to facilitate bonding to other metals by way of soldering have been developed, for example, Elbreder et. al.,[3]. These surface treatment chemistries for aluminum typically include inorganic compounds, such as metal halides, Eichhorn et.al.,[4] and require elevated temperatures to enable an appropriate binding reaction between aluminum and the required bonding metal (such as a soldering metal or an alloy). Inorganic fluorine salts and/or organic amine fluorides or acid fluorides have been used to enable surface activation of aluminum for bonding to metals/solders[5-14]. There are also methods that do not use fluorides/fluoroborates, for example wax-like formulations as described in references 15-20).

Such formulations, however, may not be suitable for use in devices that include temperature sensitive materials or components. Typical consumer RFID tags are low cost, mass produced items that include aluminum/aluminum alloy antennas, and typically use a plastic/polymer substrate. Such plastic substrates typically degrade at elevated temperatures. A low temperature, for example in the range 70° to 250° C., is preferable to maintain the integrity of the plastic substrate during surface activation treatment.

Similarly, it is not clear if such wax-like formulations are suitable for high speed manufacturing methods typically used in the production of RFID tags. Application to surfaces in such methods generally involves rapid and scalable methods such as dipping, coating, spraying, etc. of an entire surface; it is not apparent that a wax-like substance can be applied in this manner. Alternatively, printing (for example screen printing, stencil printing, gravure, pad application, roll-to-roll printing, and/or ink jet printing) can be used to activate a portion of a surface. It is not clear, however, that such printing techniques can be applied to existing aluminum bonding formulations at an industrial scale.

Such printing techniques require a slurry, paste, suspension or a solution that dries quickly after application. Use of an appropriate solvent or a carrier (for example, an organic or mixed aqueous solvent) is necessary to achieve this. Another important characteristic for a printable, for example a screen printable or stencil printable surface activation chemistry for aluminum bonding to metals is compatibility with a solvent that permits adjustment the rheology of the printing ink (see Durairaj[23] and Hsu[24]. It is not clear that such solvents are compatible with existing aluminum bonding formulations.

Screen printable soldering pastes/fluxes having soldering metal powders have been developed[21,22]. The limitation of these and similar fluxes, which have soldering metal powders as a part of their composition, is that their use is restricted to the formulation's particular solder-metal/alloy composition. On the other hand a suitable printable surface activation treatment should provide a user with the freedom to use any solder for metal bonding to aluminum.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for compositions and methods for low temperature, scalable bonding of aluminum with other metals.

SUMMARY OF THE INVENTION

The inventive subject matter provides compositions and methods that permit joining of metals with aluminum. Compositions of the inventive concept can be formulated without the use of organic solvents, and can be applied using conventional printing methods. Application and curing steps can be performed at temperatures that are compatible with plastics/polymers used in mass produced consumer devices, such as the aluminum antenna of an RFID tag.

One embodiment of the inventive concept is a printable composition that provides a printable surface activation of aluminum or aluminum alloys for metal bonding, where the printable composition includes an aqueous solvent or a mixed aqueous solvent. The printable composition can also include an organic amine (such as ethanolamine and/or dodecylamine) and/or a fatty acid (such as palmitic acid or a salt of palmitic acid). The printable composition can be formulated as a gel or cream in order to facilitate printing by certain techniques. Suitable printing techniques for application of the printable composition include screen printing, stencil printing, gravure printing, and pad printing). One example of such a printable composition includes an amine hydrofluoride in an aqueous solvent that does not include an organic solution, and that is formulated as a gel. Another example of such a printable composition includes a mixture of fatty acids, salts of fatty acids, amine fluorides, amine acid fluorides, and amine tetrafluoroborates in an aqueous solution that does not include an organic solvent, and that is formulated as a gel Another example of such a printable composition includes mixture of fatty acids, salts of fatty acids, amine fluorides, amine acid fluorides, and amine tetrafluoroborates in an aqueous solution. The rheology of such printable compositions can be adjusted for a printing technique by the addition of an organic cosolvent (such as a hydrocarbon, a halogenated hydrocarbon, and/or an alcohol). In some embodiments the printable composition includes a surfactant.

While hydrocarbons in general are contemplated as cosolvents, in preferred embodiments the cosolvents include hydrocarbons having at least 6 carbons (e.g., hexane, heptane, octane, nonane, decane, more than 10 carbons, more than 15 carbons, more than 20 carbons, etc), including fully saturated (e.g., alkyl), partially saturated (e.g., alkenyl), or fully unsaturated hydrocarbons (e.g., alkynyl), and branched or unbranched hydrocarbons, or mixtures thereof. Viewed from another perspective, contemplated alkyl (or alkenyl, or alkynyl) cosolvents include $C_{6-20}$ alkyl, $C_{6-20}$ haloalkyl (or -enyl, or -ynyl), $C_{6-20}$ alkoxyl, $C_{6-20}$ alkoxyalkyl (or -enyl, or -ynyl), $C_{6-20}$ alkylamino (or -enyl, or -ynyl), $C_{6-20}$ aminoalkyl (or -enyl, or -ynyl), and the like, or mixtures thereof. Likewise, ethers (R—O—R') are also contemplated as preferred hydrocarbons for cosolvents, preferably ethers with a melting point greater than 30° C., more preferably greater than 35° C., and more preferably greater than 40° C. or 45° C. While it is contemplated that preferred cosolvents include only one kind of hydrocarbon (e.g., only heptanes, etc), cosolvents having a mixture of different hydrocarbons (e.g., heptanes and an ether with melting point greater than 40° C., kerosene, etc) are also contemplated.

Another embodiment of the inventive concept is a method of bonding a metal to aluminum, by depositing a printable composition (as described above) on an aluminum surface to form a coated aluminum surface and coupling the metal to the coated aluminum surface. The printable composition can be depositing using a printing technique, such as screen printing, pad printing, inkjet printing, stencil printing, and/or gravure printing. In some embodiments the method also includes a step of curing the coated aluminum surface. Coupling of the metal to the coated aluminum surface can be performed by any suitable method, including welding, ultrasonic welding, and/or soldering.

Various objects, features, aspects and advantages of the inventive subject matter will become more apparent from the following detailed description of preferred embodiments.

DETAILED DESCRIPTION

Figure 1:
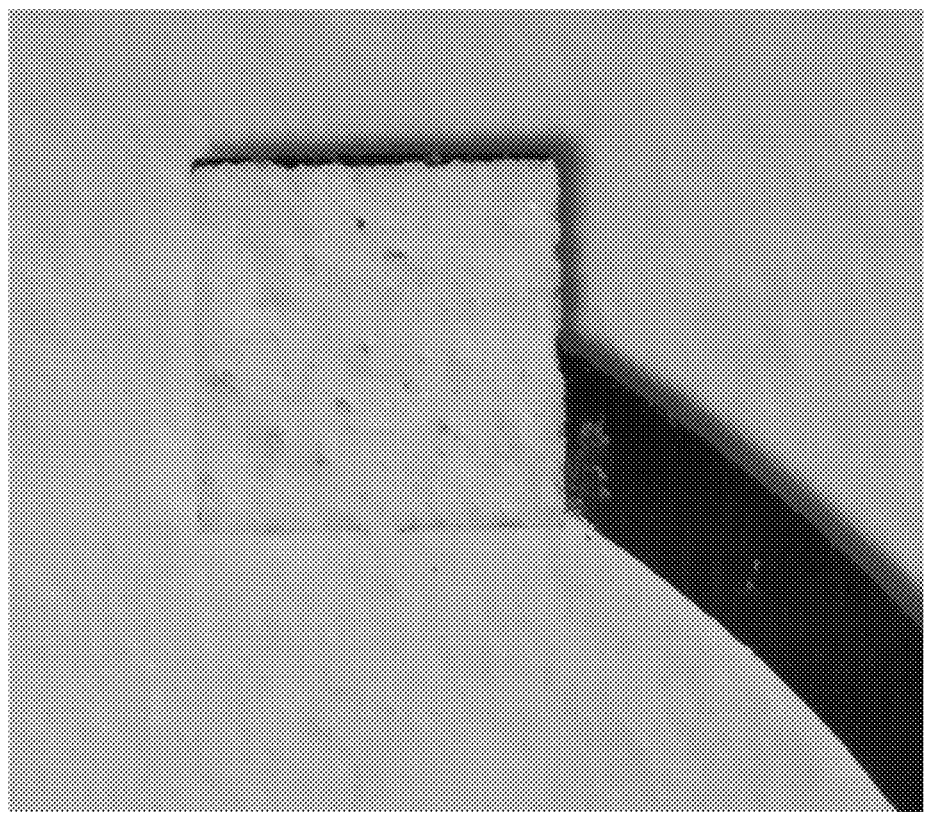
FIG. 1 provides a photograph of a stencil printed area of surface activation on an aluminum substrate.

The inventive subject matter provides apparatus, systems and methods in which a printable surface activation of aluminum or aluminum alloys for metal boding is based on water as a solvent. In some preferred embodiments the printable surface activation is achieved by screen, stencil, gravure or pad printing. In some preferred embodiments the surface activation is achieved by using an amine hydro fluoride that can be gelled using water as a solvent. In some preferred embodiments the surface activation is achieved by a mixture of fatty acids, their salts, amine fluorides, amine acid fluorides, and amine tetrafluoroborates that can be gelled by water as a solvent.

One should appreciate that compositions and methods of the inventive concept provide a convenient and scalable method for bonding of aluminum with other metals, under low temperature conditions that are compatible with many plastics and with minimal to no generation or release of volatile organics.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Inventors have eliminated the use of organic solvents in the formulation of the screen printing ink for surface activation of aluminum for metal bonding, rendering such formulations compatible with the use of plastic substrates and/or components. Compositions of the inventive concept utilize water as a solvent in order to achieve rheologies compatible with various printing technologies (such as screen printing, stencil printing, roller printing, inkjet printing, etc.), without the need for organic solvents.

Compositions of the inventive concept can provide a printable formulation that acts as a surface activation flux for metal bonding metals to aluminum, for example by soldering. The elimination of an organic solvent advantageously provides a "green technology" for aluminum surface activation for metal bonding. This is particularly advantageous in the production of RFID tags, which are produced in large numbers (i.e. several million units per year). In eliminating organic solvents subsequent curing steps do not involve any significant liberation of organic fumes or vapors.

In some embodiments compositions of the inventive concept can include mixed solvents (i.e. aqueous solvent systems that include organic solvent components). In such mixed aqueous solvents water can be present at concentrations ranging from 0.001% to 99% v/v (preferably 0.001% to 10% v/v). Suitable organic solvents for in such mixed aqueous solvent systems can be water miscible, for example low molecular weight alcohols, ketones, ethers, esters, and aldehydes. Such organic solvents can be present only during certain steps during the production of a printable formulation of the inventive concept, or can be present in the final formulation.

Compositions of the inventive concept can include an organic amine and/or an organic amine derivative. Such organic amines can include a carbon chain of from 2 to 12 carbons in length, and include at least one amine group. In some embodiments the organic amine can include additional substituents, such as a hydroxyl group, a carboxyl group, and/or a halogen. In some embodiments the organic amine can be present as a free base. In other embodiments the organic amine can be present as a salt (such as a tetrafluoroborate salt) or as a complex with a mineral acid (such as HCl or HF). Suitable organic amines include ethanolamine and dodecylamine.

Compositions of the inventive concept can include a fatty acid and/or a fatty acid derivative. Such fatty acids can be saturated or unsaturated. Suitable saturated fatty acids include propionic acid, butyric acid, valeric acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, archidic acid, heneicosylic acid, behenic acid, tricosylic acid, lignoceric acid, pentacosylic acid, cerotic acid, heptacosylic acid, montanic acid, henatriacontylic acid, lacceroic acid, psyillic acid, geddic acid, ceroplastic acid, hexatriacontylic acid heptatriacontanoic acid, and octatriacontanoic acid. Suitable unsaturated fatty acids include alpha linoleic acid, stearidonic acid, eicospentaenoic acid, docosahexaenoic acid, linoleic acid, linolelaidic acid, gamma linolenic acid, dihomo-gamma-linolenic acid, arachidonic acid, docosatetraenoic acid, palmitoleic acid, vaccenic acid, paulinic acid, oleic acid, elaidic acid, gondoic acid, erucic acid, nervonic acid, and mead acid. Such fatty acids can be in the form of free acids or in the form of salts (for example, an ammonium, sodium, or potassium salt). In some embodiments the fatty acid is palmitic acid or palmitate.

Compositions of the inventive subject matter optionally include a filler particle or mixture of particles, for example at least one of Sn, Ag, Zn, Cu, In, Sb, Bi, Au, Cd, Al, Si, Ge, Co, Ni, P, Cr, Se, Te, oxides thereof, or combinations thereof. Such particles, or combinations of particles, are present in the composition as a less than 40% weight basis, preferably less than 30% weight basis, more preferably less than 25% weight basis, yet more preferably less than 15% weight basis, yet more preferably less than 10%, 5%, or less than 1% weight basis.

Figure 2:
FIG. 2 provides a photograph of surface-mount components reflow soldered onto an aluminum substrate following treatment of the aluminum surface with a surface activation ink using stencil printing.

Compositions of the inventive concept can have rheological properties that allow them to be printable by conventional and scalable printing techniques. This advantageously minimizes consumption of these compositions by facilitating directed application only to portions of an aluminum surface where other metals are to be joined. Suitable printing techniques include screen printing, stamping, ink jet printing, and roller printing. Suitable rheological characteristics for compositions of the inventive concept are dependent upon the printing technique employed. For example, silk screening, stencil printing, stamping, and roller printing can utilize gels, creams, and relatively viscous solutions or emulsions. An example of a pad of a printable composition of the inventive subject matter deposited on an aluminum surface using stencil printing is shown in FIG. 2. On the other hand, ink jet printing and other droplet-dispensing technologies can require compositions with relatively low viscosity and good flow characteristics. Rheological properties of compositions of the inventive concept are a function of components selected, concentrations of such components, the solvent system used, and/or processing steps (such as mixing or blending) during manufacture. In some embodiments compositions of the inventive concept can have non-Newtonian characteristics (i.e. fluid but having a viscosity that changes depending upon pressure or mechanical stress applied). Viscosity of compositions of the inventive concept can range from 1.1 Cp to about 10,000 Cp.

Rheological characteristics of compositions of the inventive concept can be modified from a base formulation for suitability for a particular printing technology by the addition of organic compounds and/or solvents. Suitable organic solvents include ketones, ethers, esters, aldehydes, hydrocarbons, and/or halogenated hydrocarbons. Similarly, in some embodiments one or more surfactants can be included in a composition of the inventive concept in order to adjust rheological properties. Suitable surfactants include anionic surfactants, cationic surfactants, zwitterionic surfactants, and non-ionic surfactants.

In methods of the inventive concept a composition of the inventive concept is brought into contact with an aluminum surface, for example by printing. In some embodiments the aluminum surface can be used as provided. In other embodiments the aluminum surface can be treated, for example by degreasing and/or removal of some or all of the aluminum oxide layer, prior to being brought into contact with a composition of the inventive concept. In some embodiments the composition is applied to the aluminum surface prior to contacting with another metal to be joined to the aluminum. In other embodiments the composition is applied to the non-aluminum metal, which is in turn brought into contact with the aluminum surface such that a composition of the inventive concept is interposed between the two metals. In still other embodiments the non-aluminum metal is brought into near contact with the aluminum surface and a composition of the inventive concept is injected or otherwise introduced into the intervening space.

In a preferred embodiment, a composition of the inventive concept is applied selectively to a portion of an aluminum surface to which another metal is to be joined, using a printing process. For example, aluminum deposited on a plastic or polymer substrate provides an exposed aluminum surface that can be suitable for printing. Accordingly, a sheet of aluminum devices can be deposited on a plastic or polymer substrate and subjected to printing (for example, by silk screening, pad printing, or ink jet printing) using an "ink" comprising a composition of the inventive concept. Such printing can be directed to all or to one or more selected portions of each aluminum device, for example at points of electrical contact. Following application of the ink the printed aluminum surface can be subjected to a curing process. Such curing can serve to remove solvent from the printed ink composition. A curing process can involve incubation at elevated temperature (e.g. from about 30° C. to about 500° C.) and/or reduced pressure (from about 0.1 kPa to about 100 kPa). Curing conditions can be selected to be compatible with a substrate that supports an aluminum surface to be printed. For example, if the aluminum substrate is supported on a polyethylene substrate curing conditions can utilize a temperature and exposure time that keeps the polyethylene substrate intact. In some embodiments, for example where it is desirable to eliminate a supporting substrate following printing, curing conditions can be selected to melt, fragment, powder, or otherwise eliminate a supporting substrate while maintaining the aluminum surface.

Figure 3:
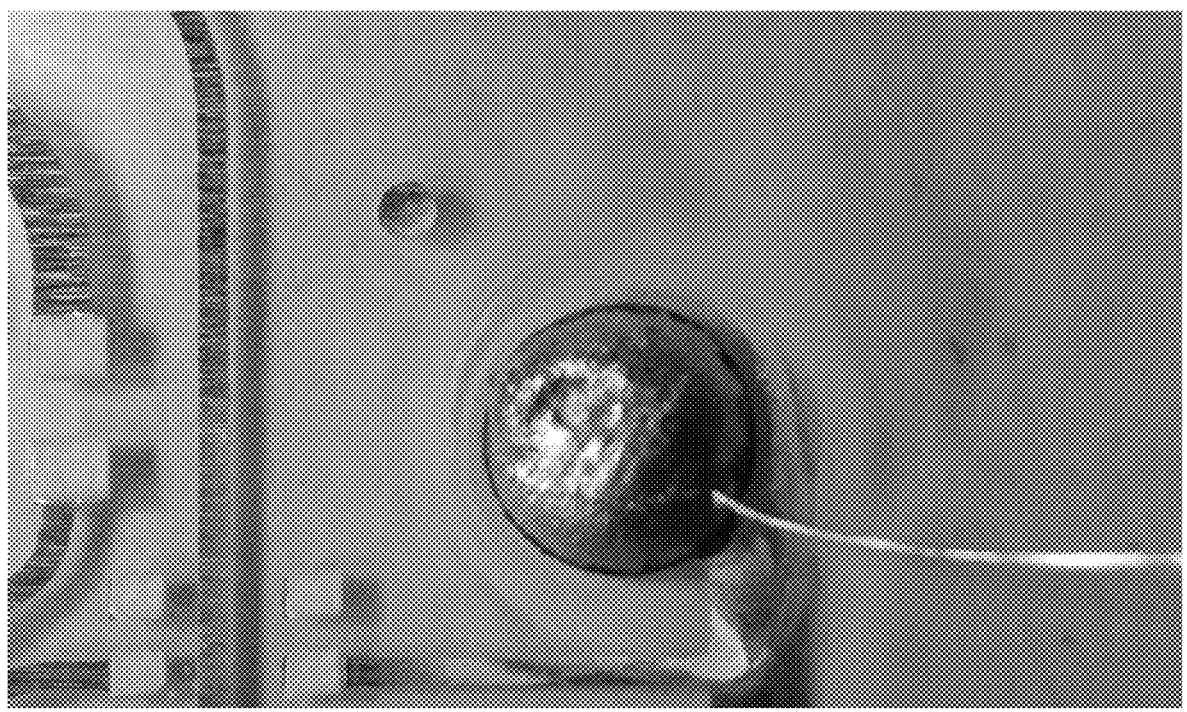
FIG. 3 provides a photograph of a copper wire soldered to an aluminum substrate via a stencil-printed surface applied to the aluminum.

After printing and, in some embodiments, a curing step, the non-aluminum metal can be joined to the aluminum surface. This can be accomplished by any suitable means, including welding, ultrasonic welding, and/or soldering. In some embodiments an additional protective coating can be applied to the joined metal surfaces to improve mechanical stability and/or protect from corrosion and environmental effects. For example, following joining of the non-aluminum metal to the aluminum surface a protective coating of polymer, rubber, varnish, and/or wax can be applied to the joined metals. An example of a metal joined to an aluminum surface following deposition of a printable composition of the inventive subject matter to aluminum is provided in FIG. 3, which shows surface mounting of metal-clad electronic components to a treated area of an aluminum surface by reflow soldering. Another example is provided in FIG. 4, which shows attachment of a copper wire to a treated area of an aluminum surface by soldering.

The following examples illustrate the formulation of water-based screen printable surface activation to achieve metal bonding to aluminum (for example, soldering to selected aluminum connection pads).

Example 1

Ethanolamine tetrafluoroborate (ETFB): 30 g of monoethanolamine and 47 g of ammonium tetrafluoroborate were mixed and heated to 80° C. for 48 hours, or until ammonia was no longer liberated. The resulting product was a thick liquid.

Example 2

Ethanolamine hydrofluoride (ETF): 100 g of monoethanolamine was mixed with 160 g of 25% HF (aq). Mixing was performed by chilling the monoethanolamine using a dry ice-acetone bath with strong stirring. The HF solution was then added incrementally over approximately 30 minutes. The contents were left to stir overnight. The resulting product was a yellow-orange viscous liquid.

Example 3

Sodium Palmitate: 260 g of palmitic acid was heated to 100° C. and 500 mL of 2N sodium hydroxide solution was very gradually added. An additional 200 g of boiling water was added to the mixture. The well-stirred mixture was poured into a baking dish and then placed into a 150° C. oven for 4 hours. The dish was then removed and contents allowed to cool to room temperature. A white sold was obtained.

Example 4

Dodecylamine hydrofluoride (DDAHF): 100 g of dodecylamine was heated until the sample reached 80° C. and the bulk was thoroughly a liquefied. 20 g of 50% HF (aq) was added dropwise with stirring. The resulting sample obtained was a white, hard waxy disk of wax. This was melted by the addition of 120 g of boiling water while heating and stirring. The resulting product was a smooth, uniform gel that can be printed.

Example 5

ETF screen printable surface activation formulation (Sodium Palmitate, Palmitic acid, ETF): 38 g of palmitic acid was melted at 100° C. along with 2 g of sodium palmitate. 60 g of ethanolamine fluoride salt was added to the molten palmitic acid/sodium palmitate mixture. The sample was stirred thoroughly at 100° C. for 5 minutes, after which 70 g of boiling water was added to the mixture. The sample was stirred for 15 minutes, and set aside to cool. The result was a white smooth cream that can be printed.

Example 6

Screen printing of DDAHF: A portion of the gel from Example 4 was spread on a patterned screen and was printed on a sheet of aluminum foil. The foil was cured at 140° C. for 2 minutes in an oven. The foil was left to cool, and was subsequently soldered to using Oatey™ soldering wire on the patterned parts of the foil. The non-activated parts of the foil did not respond to aluminum bonding with the solder. Only the screen-printed activated patterned areas of the foil provided bonding with the solder.

Example 7

Screen printing of the ETF Screen Printable Surface Activation: A portion of the cream from Example 5 was spread on a patterned screen and was printed on a sheet of aluminum foil. The foil was cured at 140° C. for 3 minutes in an oven. The foil was left to cool, and was subsequently soldered to using Oatey™ on the patterned parts of the foil. The non-activated parts of the foil did not respond to aluminum bonding with the solder. Only the screen-printed activated patterned areas of the foil provided bonding with the solder.

Example 8

Figure 5:
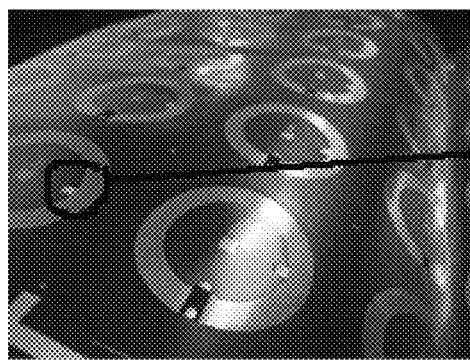
FIG. 5 provides a photograph of aluminum antennae laminated onto a polyethylene sheet, following application of DDAHF to bonding pads by screen printing.
Figure 6:
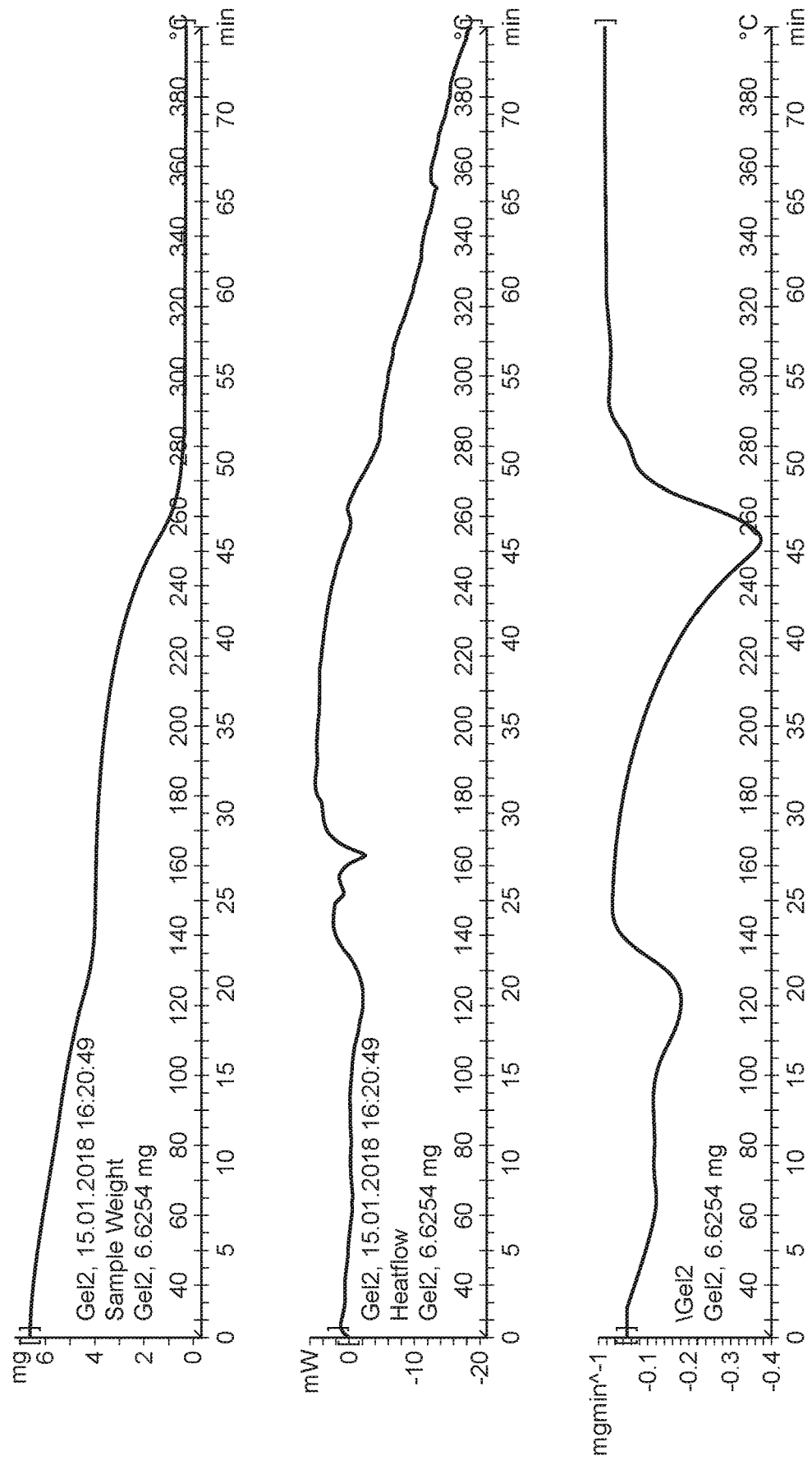
FIG. 6 depicts a thermogram of a printable aluminum surface treatment ink.

RFID Example: A portion of the gel from Example 4 was spread on a patterned screen and was subsequently printed onto a sheet of RFID tags laminated on polyethylene (see FIG. 5), selectively on the bond pads. The sheet was cured at 85° C. for 3 minutes in an oven. The sheet was left to cool (see FIG. 6). A lead free solder was used to solder the activated bond pad area of the antenna.

Example 9

Dodecylamine flux: A round bottom flask fitted with a stirrer was charged with 197 g of molten dodecylamine and stirred continuously. 217 g of 4.62 molal aqueous HF was added via a plastic dropping funnel. The contents were mixed for 30 minutes to obtain a printable slurry. The slurry was stencil printed on aluminum deposited on polyethylene and cured at 85° C. for 3 minutes.

Figure 4:
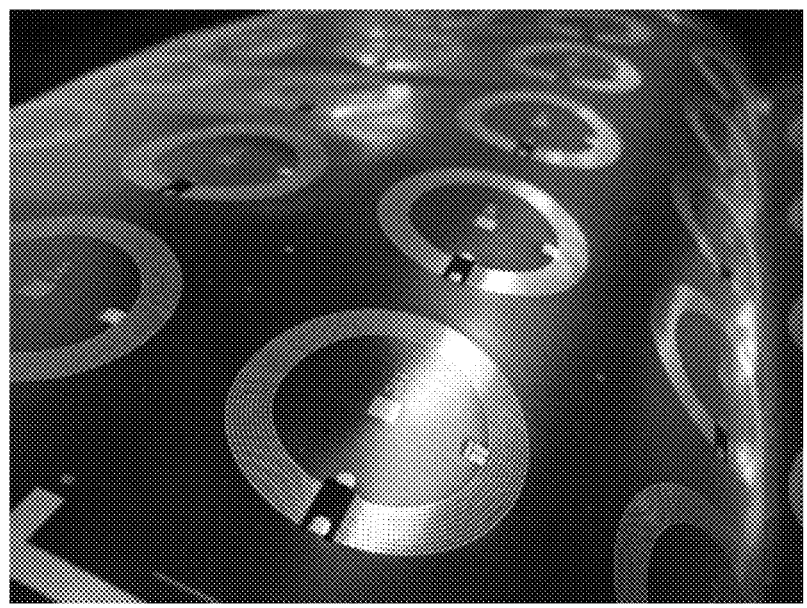
FIG. 4 provides a photograph of aluminum antennae laminated onto a polyethylene sheet. Square bonding pads provide connection points with external circuitry.

An example of treatment of an aluminum surface using a printable aluminum surface treating ink of the formulation described in Example 9, which is useful for direct soldering of copper or aluminum wires for RFID and surface mount applications, is shown in FIG. 4. A copper wire was soldered to a printed area produced as described above using a conventional soldering iron. The cooper wire soldered to the printed area of the pattern very strongly. A thermogram of this printable ink is shown in FIG. 1., and shows that at 290° C. and above there is practically no surface treatment ink left behind on the substrate.

REFERENCES

1. Babcock, G. J. et al, U.S. Pat. No. 3,008,230, 1957
2. Preikszat, D. et al, US 2015/0053770 A1, 2013
3. Elbreder, C. H. et al, U.S. Pat. No. 3,330,028, 1967
4. Eichhorn, E. G. et al, U.S. Pat. No. 3,066,405, 1962
5. Klokner, S et al, CS 112145, 1964
6. Tomisaburo, O, JP 34001163, 1959
7. Peterson, S. W. et al, U.S. Pat. No. 2,981,648, 1961
8. Cho, H. Y, KR 2015-12716, 2015
9. JP 54058659, 1978
10. JP 1983-175051, 1983
11. Nussberger, J, CS 112169, 1964
12. Gale, W. S, et al, U.S. Pat. No. 3,119,179, 1958
13. Takashi, F. et al, JP 61033791, 1984
14. Pandher, R. et al, US 2016/0175994 A1, 2016
15. Mloczek, K. et al, PL 1986-260219, 1988
16. Golubchik, E. M., SU1364425 A1, 1988
17. Bagno, S., U.S. Pat. No. 2,845,700, (1958)
18. Fleming et al, U.S. Pat. No. 8,070,045 B1 (2011)
19. Stayner, U.S. Pat. No. 3,960,613, (1976)
20. Stayner et al, U.S. Pat. No. 4,113,525, (1978)
21. Ohmi, Y., JP 1972-130276 (1972)
22. Katsuhiko, H., JP 2002224884, (2001)
23. Durairaj, R. et al, Materials and Design, 30:3812, (2009)
24. Hsu C. P. et al, Journal of Polymer Research, 20:277 (2013

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of bonding a copper metal to aluminum, comprising:
    depositing a printable composition on the copper metal to form a coated copper surface, wherein the printable composition comprises (i) an aqueous solvent or a mixed aqueous solvent, ii) a fatty acid and (iii) an organic amine, and wherein the printable composition does not include a metal, wherein the copper metal is brought into near contact with an aluminum surface before the step of depositing the printable composition; and
    coupling the coated copper surface directly to the aluminum surface, wherein at least one of the copper surface or the aluminum surface comprises part of an electronic component.

2. The method of claim 1, wherein depositing is performed using a printing technique.

3. The method of claim 2, wherein the printing technique is selected from the group consisting of screen printing, pad printing, inkjet printing, stencil printing, and gravure printing.

4. The method of claim 1, further comprising a step of curing the coated non-aluminum surface at a reduced pressure.

5. The method of claim 1, wherein coupling is performed by a technique selected from the group consisting of welding, ultrasonic welding, and soldering.

6. The method of claim 1, wherein the printable composition has a viscosity between 1.1 cP and 10,000 cP.

7. The method of claim 6, wherein the organic amine is selected from the group consisting of an ethanolamine and a dodecylamine.

8. The method of claim 1, wherein the fatty acid is palmitic acid or a salt of palmitic acid.

9. The method of claim 1, wherein the printable composition is in the form of a gel or cream.

10. The method of claim 1, wherein the printable composition comprises an amine hydrofluoride in an aqueous solvent that does not include an organic solvent, and that is formulated as a gel.

11. The method of claim 1, wherein the printable composition comprises a mixture of two or more components selected from the group consisting of fatty acids, salts of fatty acids, amine fluorides, amine acid fluorides, and amine tetrafluoroborates in an aqueous solution that does not include an organic solvent, and that is formulated as a gel.

12. The method of claim 1, wherein the printable composition comprises a mixture of two or more components selected from the group consisting of fatty acids, salts of fatty acids, amine fluorides, amine acid fluorides, and amine tetrafluoroborates in an aqueous solution, wherein rheology is adjusted for a printing technique by the addition of an organic cosolvent.

13. The method of claim 12, wherein the organic cosolvent is selected from the group consisting of a hydrocarbon, a halogenated hydrocarbon, and an alcohol.

14. The method of claim 12, wherein the organic cosolvent is selected from the group consisting of saturated, partially unsaturated, or unsaturated hydrocarbons having between 6 and 20 carbons.

15. The method of claim 4, wherein the reduced pressure is less than 100 kPa.

* * * * *